United States Patent
Smith et al.

(10) Patent No.: US 8,204,883 B1
(45) Date of Patent: Jun. 19, 2012

(54) SYSTEMS AND METHODS OF DETERMINING GENRE INFORMATION

(75) Inventors: Graeme N. Smith, Edinburgh (GB); Matthew J. Round, Edinburgh (GB); Jonathan G. G. Tams, Edinburgh (GB); Dominic E. H. K. Seymour, Edinburgh (GB)

(73) Assignee: Amazon Technologies, Inc., Reno, NV (US)

( * ) Notice: Subject to any disclaimer, the term of this patent is extended or adjusted under 35 U.S.C. 154(b) by 671 days.

(21) Appl. No.: 12/105,163

(22) Filed: Apr. 17, 2008

(51) Int. Cl.
G06F 7/00 (2006.01)
G06F 17/30 (2006.01)

(52) U.S. Cl. ....................................................... 707/736

(58) Field of Classification Search .................. None
See application file for complete search history.

(56) References Cited

U.S. PATENT DOCUMENTS

| | | | |
|---|---|---|---|
| 5,933,806 A | 8/1999 | Beyerlein et al. | |
| 5,963,916 A * | 10/1999 | Kaplan | 705/7.29 |
| 6,438,579 B1 | 8/2002 | Hosken | |
| 6,539,395 B1 * | 3/2003 | Gjerdingen et al. | 1/1 |
| 2002/0116291 A1 * | 8/2002 | Grasso et al. | 705/27 |
| 2003/0164844 A1 * | 9/2003 | Kravitz et al. | 345/700 |
| 2003/0236695 A1 * | 12/2003 | Litwin, Jr. | 705/10 |
| 2004/0031058 A1 | 2/2004 | Reisman | |
| 2006/0143236 A1 | 6/2006 | Wu | |
| 2006/0259458 A1 | 11/2006 | Hunter et al. | |
| 2006/0265508 A1 | 11/2006 | Angel et al. | |
| 2007/0033170 A1 | 2/2007 | Sull et al. | |
| 2007/0192703 A1 | 8/2007 | Unz | |
| 2007/0265720 A1 * | 11/2007 | Sako et al. | 700/94 |
| 2008/0005064 A1 | 1/2008 | Sarukkai | |
| 2008/0021851 A1 * | 1/2008 | Alcalde et al. | 706/21 |
| 2008/0059453 A1 | 3/2008 | Laderman | |
| 2009/0024605 A1 * | 1/2009 | Yang | 707/5 |

OTHER PUBLICATIONS

Kleedorfer et al., "Making Large Music Collections Accessible using Enhanced Metadata and Lightweight Visualizations," IEEE, 2007.*
Xu et al., "Towards the semantic web: Collaborative tag suggestions," CiteSeerx, 2006.*
"The SOMeJB Music Digital Library—Prototype 2", http://www.ifs.tuwien.ac.at/~andi/somejb/prototype2.html, printed Apr. 17, 2008, 26 pages, Department of Software Technology, Vienna University of Technology.
Fernandes, Llewelyn et al., "EOL Guide—A guide to the Exteca Ontology Language", http://exteca.sourceforge.net/guide/eol-guide-1.0.pdf, Sep. 14, 2002, 11 pages.
Sanguine et al., "Tag strength values", http://www.uvlist.net/forum/thread/15575/Tag+strength+values, printed Apr. 17, 2008, 3 pages.
Altimel, I. Kuban et al., "Vector Quantization for Arbitrary Distance Function Estimation", http://citeseer.ist.psu.edu/203467.html, Computer Science Department, Ontario, Canada, 1995, 17 pages.

* cited by examiner

*Primary Examiner* — Pierre Vital
*Assistant Examiner* — Rachel J Lee
(74) *Attorney, Agent, or Firm* — Lee & Hayes, PLLC

(57) ABSTRACT

Systems and methods of determining genre information are provided. A particular method includes receiving a first data set including a plurality of genre descriptors and associated strength values related to particular content. Each strength value indicates a degree to which the associated genre descriptor describes the particular content. The method also includes storing a data record associating the first data set with the particular content.

40 Claims, 10 Drawing Sheets

| Electronics | Music | Your Account | Cart | Your Lists | Help |

Browse by Genre | Top Sellers

Search [_____] (Go)  Web Search (Go)

1102 — Browse by Genre:

Rock - ⟋ 1104  ⟋ 1108
    Christian Rock (Examples: Lifehouse, Skillet) <u>Listen to Samples</u>
    Progressive Rock (Examples: Pink Floyd, Rush) <u>Listen to Samples</u>

R&B and Soul -  ⟋ 1106
    Contemporary (Examples: Beyonce, Alicia Keys ) <u>Listen to Samples</u>
    Classic (Examples: Marvin Gaye, Temptations ) <u>Listen to Samples</u>

FIG. 11

SYSTEMS AND METHODS OF DETERMINING GENRE INFORMATION

FIELD OF THE DISCLOSURE

The present disclosure is generally related to determining genre information.

BACKGROUND

Artistic and literary works are commonly group by genre. A particular work may be described by more than one genre. For example, a book may be categorized as both horror and drama. In another example, a particular band or song may be considered to have elements of several genres, such as rock, pop, dance and electronica. Additionally, different people may feel differently about how a particular work should be categorized. Determining genre information can be useful to assist people in finding works that they may enjoy or works of a particular type. Hence, there is a need for an improved system and method of determining genre information.

BRIEF DESCRIPTION OF THE DRAWINGS

FIG. 11 is an illustration of a second particular embodiment of a user interface display.

DETAILED DESCRIPTION OF THE DRAWINGS

Illustrative embodiments of systems and methods of determining genre information are described. A particular system includes a genre database to store genre information for a plurality of content items. The genre information includes a genre vector for each content item. The genre vector indicates a degree to which each of a plurality of genre descriptors are perceived to describe each content item.

In a particular embodiment, a method includes receiving a first data set including a plurality of genre descriptors and associated strength values related to first content. Each strength value indicates a degree to which the associated genre descriptor describes the first content. The method also includes storing a data record associating the first data set with the first content.

In another particular embodiment, a method includes accessing a classification vector. The classification vector includes strength data indicating a degree of relevance of a particular classification descriptor to an entity. The method also includes analyzing the classification vector to determine a plurality of classification data sets for the entity. Each classification data set includes a strength descriptor and a classification descriptor. The strength descriptor describes how relevant the classification descriptor is to the entity. The method also includes generating an output including one or more of the plurality of classification data sets.

In another particular embodiment, a method includes receiving a data set from a user. The data set is associated with a particular entity and the data set includes a classification descriptor of a plurality of classification descriptors and a strength descriptor of a plurality of strength descriptors. The method also includes storing the data set with a number of additional data sets associated with the particular entity to produce an aggregated data set. Each additional data set is associated with a respective classification descriptor of the plurality of classification descriptors and a respective strength descriptor of the plurality of strength descriptors. Additionally, the method includes sorting the aggregated data set into a number of categories, where each category is associated with a particular classification descriptor and a particular strength descriptor. Further, the method includes determining a score for each category of the number of categories. The score is based on a number of data sets associated with a respective category and a strength value assigned to the particular strength descriptor of the respective category.

Figure 1:
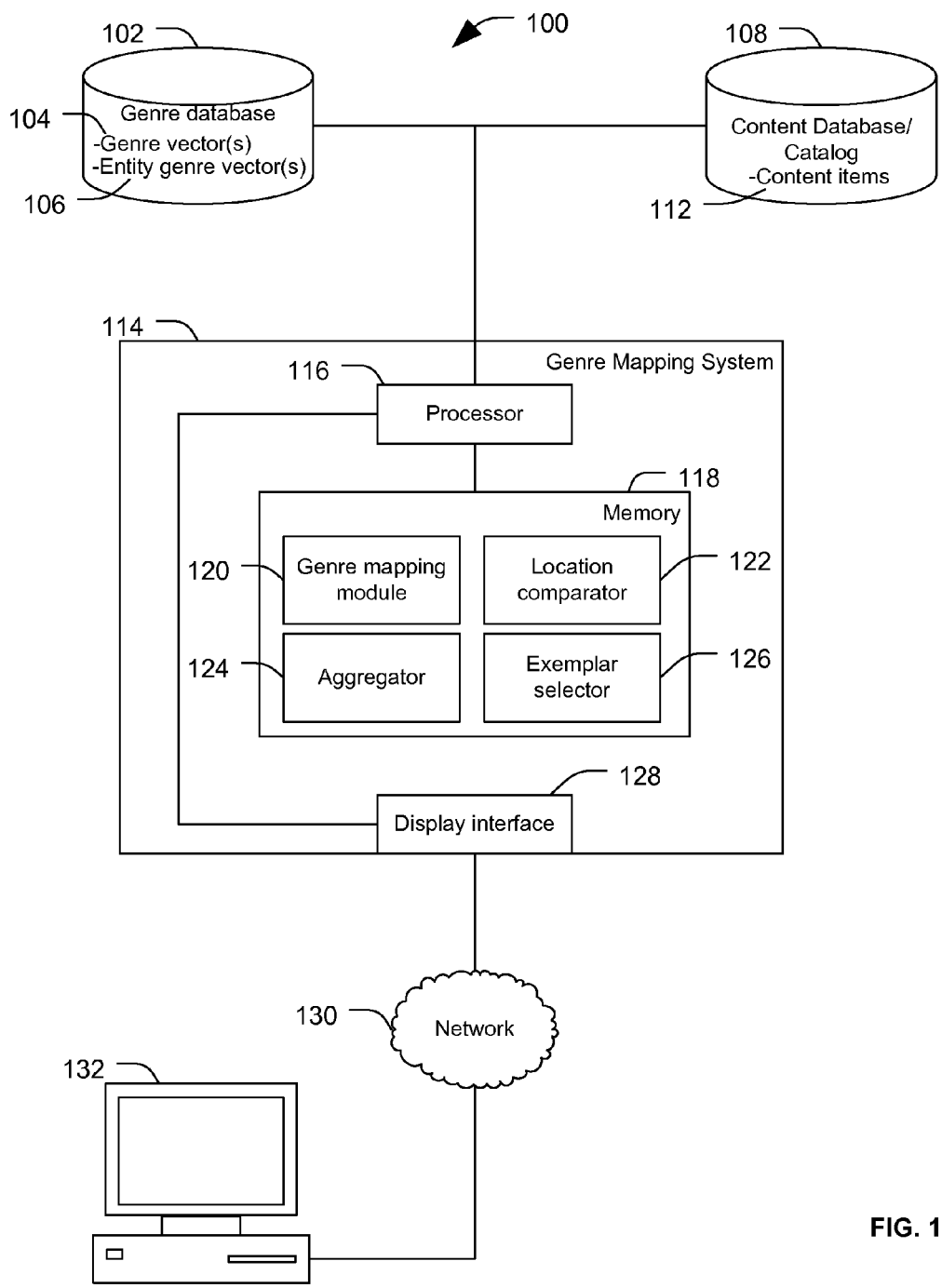
FIG. 1 is a block diagram of an embodiment of a system to determine genre information.

FIG. 1 depicts a particular embodiment of a system to determine genre information, the system generally designated 100. The system 100 includes a genre database 102 to store genre information related to a plurality of content items 112. The genre database 102 includes one or more genre vectors 104 associated with each content item 112. The genre vectors 104 indicate a degree to which each of a plurality of genre descriptors are perceived to describe each content item 112. The content items 112 may include any literary or artistic work. For example, the content items 112 may include books, plays, poems, paintings, sculptures, recorded performances (e.g., musical recordings on compact discs (CD), or movies on digital video discs (DVD)), or any combination thereof. In another example, the content items 112 may include data records of a content database/catalog 108 associated with any literary or artistic work. To illustrate, each content item 112 may be associated with a catalog entry of the content database/catalog 108. The content database/catalog 108 may list products offered for sale or rent, may provide information about the literary or artistic work, may catalog the content items for some other purpose, or any combination thereof.

The system 100 also includes a genre mapping system 114. The genre mapping system 114 includes a processor 116 and a memory 118 accessible to the processor 116. The genre mapping system 114 includes one or more modules 120-126 executable by the processor 116 to perform one or more functions of the genre mapping system 114, such as a genre mapping module 120, a location comparator 122, an aggregator 124 and an exemplar selector 126. The modules 120-126 may be implemented in software instructions executable by the processor 116 (e.g., as instructions stored in the memory 118), in hardware, or in any combination thereof. The genre mapping system 114 also includes a display interface 128. The display interface 128 is adapted to provide data communications via a network 130 with one or more user computer devices 132.

Figure 8:
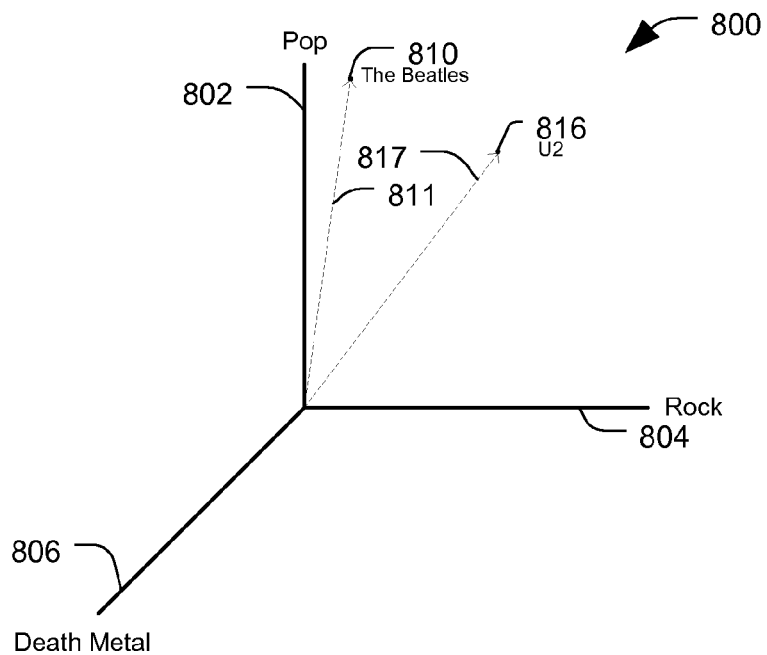
FIG. 8 is a diagram illustrating a particular embodiment of a genre space.
Figure 9:
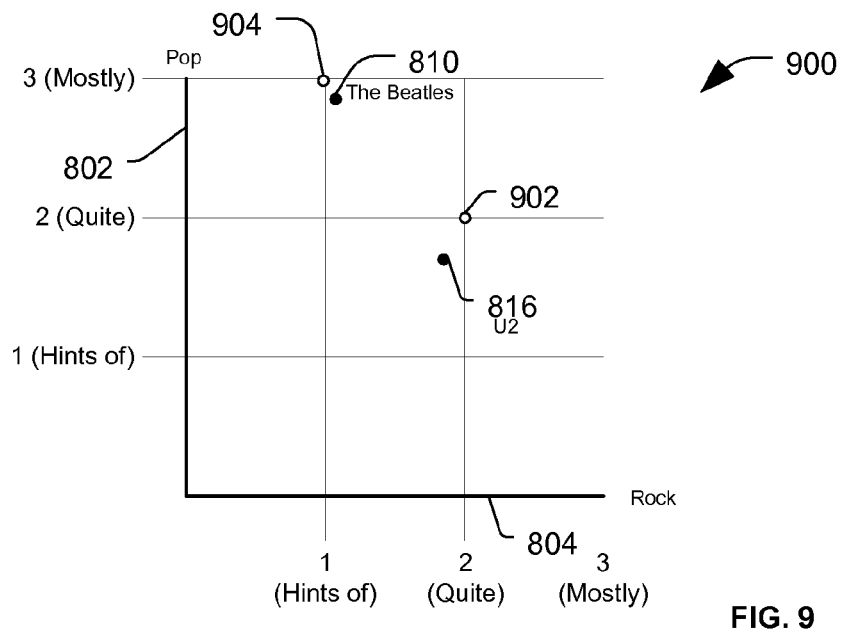
FIG. 9 is a diagram illustrating a second particular embodiment of a genre space.

In a particular embodiment, the genre vectors 104 include a plurality of data values indicating a degree to which each genre descriptor of a plurality of genre descriptors describes a particular content item. Thus, a genre vector associated with a particular content item describes a coordinate location of the content item in a genre space. The genre space includes a plurality of axes, each associated with a particular genre. In a particular embodiment, each axis of the genre space is considered to be orthogonal to each other axis. Hence, the genre vector 104 defines a particular location within the genre space relative to the various genre axes. In a particular embodiment, the genre mapping module 120 is adapted to determine a coordinate location of each content item 112 in the multidimensional genre space defined by the plurality of genre axes. Illustrative embodiments of a genre space showing several axes are illustrated in FIGS. 8 and 9.

In a particular embodiment, the aggregator 124 is adapted to aggregate data received from a plurality of sources related to a particular content item. For example, one or more users may be queried to provide genre information to form a genre vector related to a particular content item. To illustrate, a user may be asked to indicate one or more genres with which the user feels a particular song should be associated and a degree to which each genre describes the song. Thus, for example, the user may indicate that a particular song is "mostly rock" with "hints of R&B." In another example, the user may assign a numerical strength value to each applicable genre based on a strength scale. Thus, where the strength scale is 0 to 10, with 10 indicating the strongest correlation between the song and the genre, the user may indicate a strength value of 8 for rock and 2 for R&B. The genre mapping module 120 may map the genre vector provided by a particular user into the genre space. The aggregator 124 may combine a plurality of genre vectors 104 provided by different users or received from other sources to determine a representative genre vector associated with a particular content item. In a particular embodiment, the aggregator combines the plurality of genre vectors 104 with other data to determine the representative genre vector. For example, the aggregator may weight one or more of the plurality of genre vectors 104 before determining the representative genre vector. To illustrate, each of the plurality of genre vectors 104 may be weighted based on frequency information associated with each genre, based on reputation information associated with users, based on other information about the genres, content items 112, users or any combination thereof.

In another particular embodiment, the aggregator 124 aggregates a plurality of the genre vectors 104 associated with a particular entity to determine an entity genre vector 106. For example, the aggregator 124 may aggregate genre vectors 104 associated with a plurality of content items that are related to a particular entity. The entity may be a particular artist or a group of artists, a particular author, a particular production company, a particular distribution company, or any combination thereof. For example, where the entity is a particular group of artists, such as a band, the aggregator 124 may aggregate genre vectors 104 associated with songs performed by the band to determine an entity genre vector associated with the band. Hence, the genre database 102 may include genre vectors 104 associated with individual content items 112, entity genre vectors 106 associated with entities related to the content items 112, or any combination thereof. Additionally the genre mapping module 120 may map a coordinate location of the genre vectors 104, the entity genre vectors 106, or any combination thereof into the multidimensional genre space.

In a particular embodiment, the location comparator 122 is adapted to compare a first coordinate location associated with a first content item to other coordinate locations associated with one or more additional content items. The location comparator 122 may determine a relative distance between the first coordinate location and the other coordinate locations. Additionally, the location comparator 122 may compare a coordinate location associated with a first entity with other coordinate locations associated with other entities. By examining and comparing distances between coordinate locations associated with various entities or content items, the location comparator 122 may determine how similar or dissimilar the content items or entities are to one another in the genre space. The relative distance between content items or entities in the genre space may be an indication of how similar or dissimilar the content items or the entities are to one another. For example, the distance between two entities may be used to determine recommendations for a user. To illustrate, when a user at user computer device 132 indicates that he or she likes a particular author, the location comparator 122 may be used to examine an entity genre vector (or a weighted or representative genre vector as discussed below) associated with the author to determine a nearby author in genre space. The nearby author may be presented to the user as a recommendation of another author that the user may enjoy.

In a particular embodiment, genre information may be provided by a plurality of users. The genre vectors 104 may be determined by weighting information provided by each user with a user reputation value. The user reputation value may be an indication of how reliable information provided by the user has been historically. For example, information provided by users may be rated by other users or moderators as an indication of the reliability of the information. The information may pertain to a genre classification or to another topic, such as a product review. In a particular illustrative embodiment, the user reputation value may be related to whether the user has provided a particular degree of indentifying information. For example, an unregistered user (i.e., one that has not registered for a user account) may be allowed to provide genre information to categorize a content item; however, the information provided by the unregistered users may be given less weight than information provided by a registered user. In another example, information provided by a user that has provided credit card information or other personally identifiable information may be given more weight than information provided by other users. Thus, genre information provided by a more reliable user may be weighted more heavily than genre information provided by a less reliable user in determining the genre vector 104 or the entity genre vector 106.

In another particular embodiment, certain genre descriptors may be less helpful in differentiating works than other genre descriptors. For example, the content items 112 may include musical works. Many of the musical works in the content database/catalog 108 may be described as Pop music. Each of these musical works may be associated with a genre vector indicating that the musical work includes Pop music. Thus, the Pop genre may provide little information to differentiate particular musical work from other musical works in the content database/catalog 108. However, relatively few of the musical works may be described as Death Metal and associated with the genre vectors 104 indicating that the musical work are of the genre Death Metal. Thus, the genre descriptor Death Metal may be more helpful in differentiating two works than is the genre descriptor Pop. In a particular embodiment, the location comparator 122 weights genre vectors 104 by a frequency vector before comparing a coordinate location of the first entity with the second entity. The frequency vector may include information about a frequency with which each genre descriptor is associated with content items or entities in the genre database 102. For example, a genre descriptor that is associated with fewer content items (e.g., Death Metal) may be weighted more heavily than a genre descriptor that is associated more content items (e.g., Pop). When the location comparator 122 determines the relative distant between two content items in genre space, less common genre descriptors may be weighted more heavily than more common genre descriptors to provide additional differentiation between the two content items. For example, two genre vectors that are each "quite Death Metal" may be considered to be closer to one another (that is, more similar to one another) than are two genre vectors that are "mostly Pop," because of the frequency weighting.

In a particular embodiment, the exemplar selector 126 is adapted to select at least on representative entity or at least one representative content item associated with a particular genre descriptor. A representative content item for a particular genre descriptor is a content item associated with a genre vector that has a greater degree of association with the particular genre descriptor than other content items. Similarly, a representative entity for a particular genre descriptor is an entity associated with an entity genre vector that has a greater degree of association with the particular genre descriptor than other entities genre vectors in the genre space. To illustrate, a particular content item may be associated with a genre vector or a representative genre vector that associates the particular content item with only a single genre, such as Rock (i.e., the genre vector coincides with the Rock axis in genre space). Since the particular content item has been described exclusively as Rock, the content item may be a good example of the Rock music genre. In a particular embodiment, the number of users that have associated the content item with a particular genre may also be taken into account. To illustrate, a first content item may be associated with a first representative genre vector that is based on many user's input. For example, thousands of users may have indicated that the content item is "mostly Rock and quite jazz". Additionally, a second content item may be associated with a second representative genre vector that is based on few user's input. For example, a single user may have indicated that the content item is "quite Rock". Although the second content item is only associated with the Rock genre, a large number of users have identified the first content item as mostly Rock, therefore the first content item may selected as an exemplar of the Rock genre. The exemplar selector 126 may therefore select the particular content item as an exemplar of the Rock genre. In a particular embodiment, a user can request information about a particular genre via user computer device 132. The exemplar selector 126 may select an exemplar of the particular genre to provide to the user to assist in describing the genre to the user. When no particular entity genre vector or genre vector exactly coincides with a particular genre axis in the genre space, the exemplar selector 126 may select one or more nearby entity genre vectors or genre vectors to identify exemplars of the particular genre. Additionally, popularity of particular content items or entities may be considered when selecting exemplars. For example, the exemplar selector 126 may weight genre vectors or entity genre vectors based on popularity information before selecting exemplars. Thus, as between two items with the same genre vector, the more popular of the two items may be selected as an exemplar of the particular genre over the less popular of the two items. The popularity information may be determined based on historical sales information, historical search queries, historical downloads, industry popularity information (e.g., rank on best-sellers lists, etc.), ratings or rankings associated with the content items 112 via the content database/catalog 108, or any combination thereof.

Figure 2:
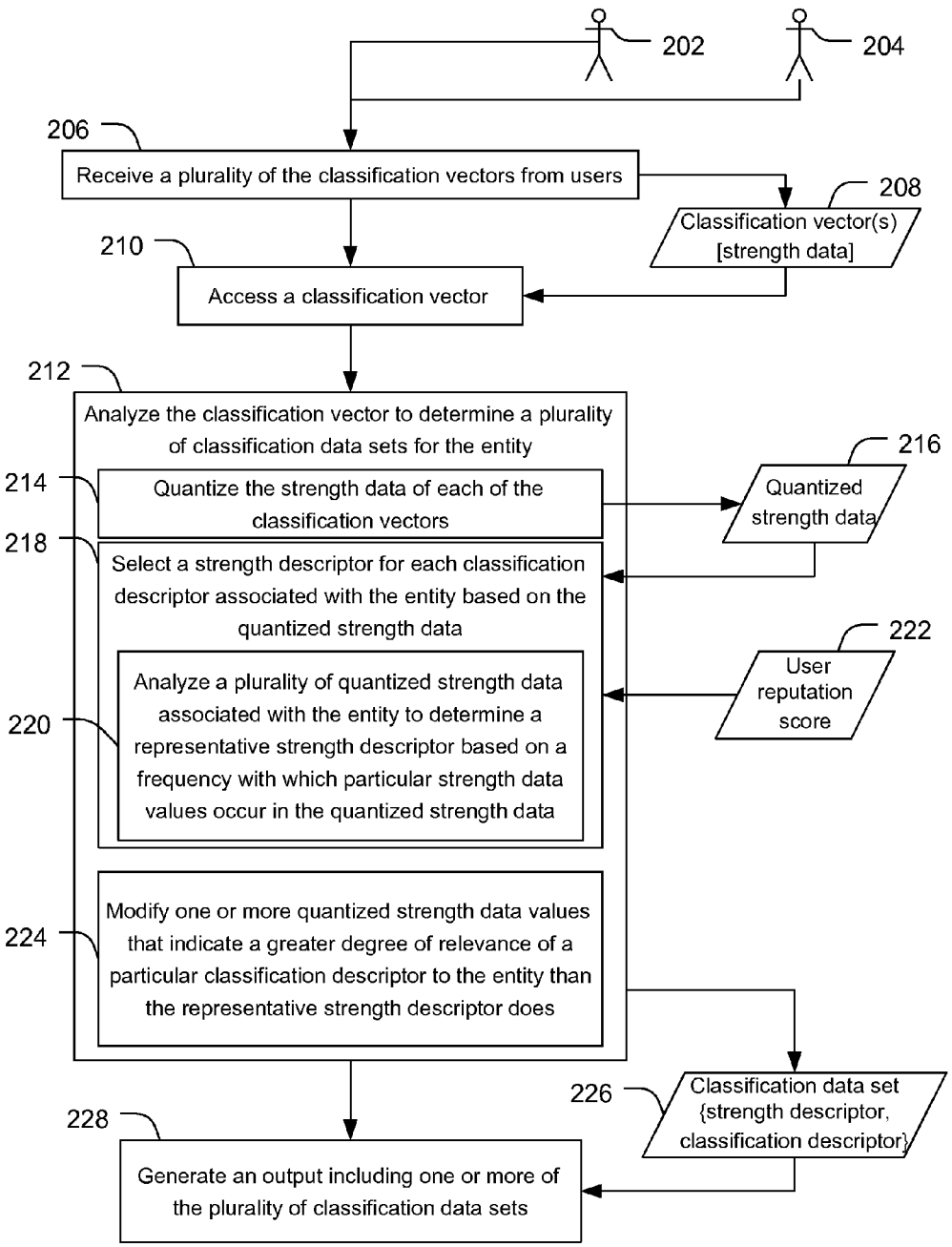
FIG. 2 is flow chart of a first embodiment of a method of determining genre information.

FIG. 2 depicts a first particular embodiment of a method of determining genre information. The method includes, at 206, receiving a plurality of classification vectors 208 from users. For example, a first user 202 and a second user 204 may each provide a classification vector 208 associated with a particular entity (e.g., a book, movie, author, artist, production company, distribution company, and so forth). Each classification vector 208 may include strength data 209 indicating a degree of relevance of a classification descriptor to the particular entity. To illustrate, the classification vector may include a plurality of data values. Each data value may be associated with a particular classification descriptor based on the location of the data value in the vector. For example, the first data value of the classification vector may be associated with a first classification descriptor, a second data value of the classification vector may be associated with a second classification descriptor, and so forth. Classification descriptors that are not relevant to the entity may have a zero value, whereas the classification vectors that are relevant to the entity may have a non-zero value. In a particular embodiment, the classification vector values may fall within a predetermined range (e.g., from 1 to 5, from 0 to 10, from 0 to 100, and so forth). An upper value of the predetermined range may indicate that the entity is strongly related to the genre descriptor, whereas a lower value may indicate that the entity is less strongly related to the genre descriptor or not related to the genre descriptor.

The method also includes, at 210, accessing at least one classification vector 208 associated with a particular entity and, at 212, analyzing the at least one classification vector 208 to determine a plurality of classification data sets 226 for the entity. Each classification data set 226 includes a strength descriptor and a classification descriptor. The strength descriptor describes how relevant the classification descriptor is to the entity. For example, the strength descriptor may be a data value or text string indicating relevance of the classification descriptor to the entity. In a particular embodiment, the strength descriptor includes an adjective (e.g., "mostly," "quite," "hints of", etc.) that indicates how closely the classification descriptor describes the particular entity. The classification descriptor may include a description of a particular genre. For example, the classification descriptor may include Rock, Pop, R&B, Electronica, Dance, and so forth. Thus, a particular classification data set 226 may indicate that the entity is "mostly Rock with hints of R&B."

In a particular embodiment, analyzing the at least one classification vector includes, at 214, quantizing the strength data 209 for each of the classification vectors 208. A strength descriptor for each classification descriptor may be selected, at 218, based on the quantized strength data 216. Quantizing the strength data 209 refers to grouping strength data values into particular data groups based on how close each strength data value is to a representative value associated with each group. For example, a strength value of 98 may be quantized by counting the strength value as a strength value of 100. Similarly, a strength value of 5.1 may be quantized to count the strength value as a value of 5. As a particular example, the strength data values may include a range from 0 to 100. The strength data values may be quantized into data sets, where each data set is associated with a multiple of ten. Thus, strength values in the range of 11 to 20 may be counted as a quantized strength value of 20. Alternately, each strength value may be rounded up or down to the nearest multiple of 10 to determine the quantized strength values. In other embodiments, the quantized strength values may include other values, such as multiples of 2, multiples of 5, multiples of 20, or any other convenient integer or non-integer value. A strength descriptor may be associated with each quantized strength value. For example, a quantized strength value of 10 may be associated with the strength descriptor "hints of." In another example, a quantized strength value of 50 may be associated with a strength descriptor of "quite." In yet another example, a quantized strength value of 80 may be associated with a strength descriptor "of mostly."

In a particular embodiment, selecting a strength descriptor for each classification descriptor includes, at 220, analyzing a plurality of quantized strength data 216 associated with a particular entity to determine a representative strength descriptor based on the frequency with which the particular strength data values occur in quantized strength data 216. To illustrate where a plurality of classification vectors are associated with a particular entity, each classification vector may include a strength data value for each classification descriptor. After being quantized, the quantized strength data 216 includes a quantized strength data value for each classification descriptor. The quantized strength data values may be counted to determine a frequency with which each quantized strength data value is associated with each classification descriptor. For example, the count may determine how many times a particular entity has a quantized strength data value of 5 for the Rock genre. A most frequent quantized strength data value may be used to select a representative strength descriptor for the entity. Table 1 further illustrates this concept:

TABLE 1

| Entity: U2 | Quantized Vector 1 | Quantized Vector 2 | Quantized Vector 3 | Quantized Vector 4 | Representative Vector |
|---|---|---|---|---|---|
| Genre Rock | 7 | 8 | 8 | 9 | 8 |
| Genre Jazz | 0 | 0 | 1 | 0 | 0 |

As illustrated in Table 1, four quantized classification vectors associated with an entity, the band U2, are shown (i.e., vector 1, vector 2, vector 3, and vector 4). Additionally, a representative classification vector is shown. The quantized classification vectors each includes strength data values associated with the classification descriptors "Rock" and "Jazz". For example, vector 1 indicates that the entity U2 has a quantized strength value of 7 for the genre Rock and a quantized strength value of 0 for the genre jazz. The representative vector includes a most frequently occurring quantized strength value for each classification descriptor. That is, since the most frequently occurring quantized strength value for the genre Rock is 8, the representative vector has a strength value of 8 for the genre Rock.

In a particular embodiment, one or more of the quantized strength data values 216 may be modified. For example, quantized strength data values greater than the determined representative strength data value associated with the representative strength descriptor may be reduced to the value associated with the representative strength descriptor. Conceptually, a strength data value that is higher than the representative value is in agreement with the representative value to a point. For example, if a first user indicates that a song is mostly Rock and a second user indicates that a song has hints of Rock, both agree that the song has at least hints of Rock. Thus, a higher strength value (associated with the mostly Rock rating) may be counted as a lower strength value (such as the hints of Rock rating). Table 2 further illustrates this concept using the data from Table 1.

TABLE 2

| Entity = U2 | Quantized Vector 1 | Quantized Vector 2 | Quantized Vector 3 | Quantized Vector 4 | Representative Vector | Count of representative value |
|---|---|---|---|---|---|---|
| Genre Rock | 7 | 8 | 8 | 8 (9) | 8 | 3 |
| Genre Jazz | 0 | 0 | 0 (1) | 0 | 0 | 4 |

Thus, the strength value of 9 in vector 4 may be modified and counted as a strength value of 8 for purposes of determining how frequently the strength value of 8 is used in the quantized vectors. A count of the number of times the strength value of 8 is used in the quantized vectors yields a value of 3. Similarly, the strength value of 1 in vector 3 may be modified to a strength value of 0, yielding a count of the strength value 0 to be 4.

In a particular embodiment, the classification vectors 208 are received from the users 202, 204 and each of the users 202, 204 are associated with a user reputation score 222. The representative strength descriptor may be determined based at least partially on the user reputation scores 222 associated with each of the users 202, 204 that provided the classification vectors 208. For example, where the first user 202 has a higher reputation score 222 than does the second user 204, the classification vector provided by the first user 202 may be weighed more heavily in selecting the strength descriptor than the classification vector provided by the second user 204.

The method also includes, at 228, generating an output including one or more of the plurality of classifications data sets 226. For example, the output may include a text description of a particular entity based on the strength descriptor and the classification descriptor. To illustrate, the output may include a description of a particular entity such as "mostly rock, with hints of R&B."

Figure 3:
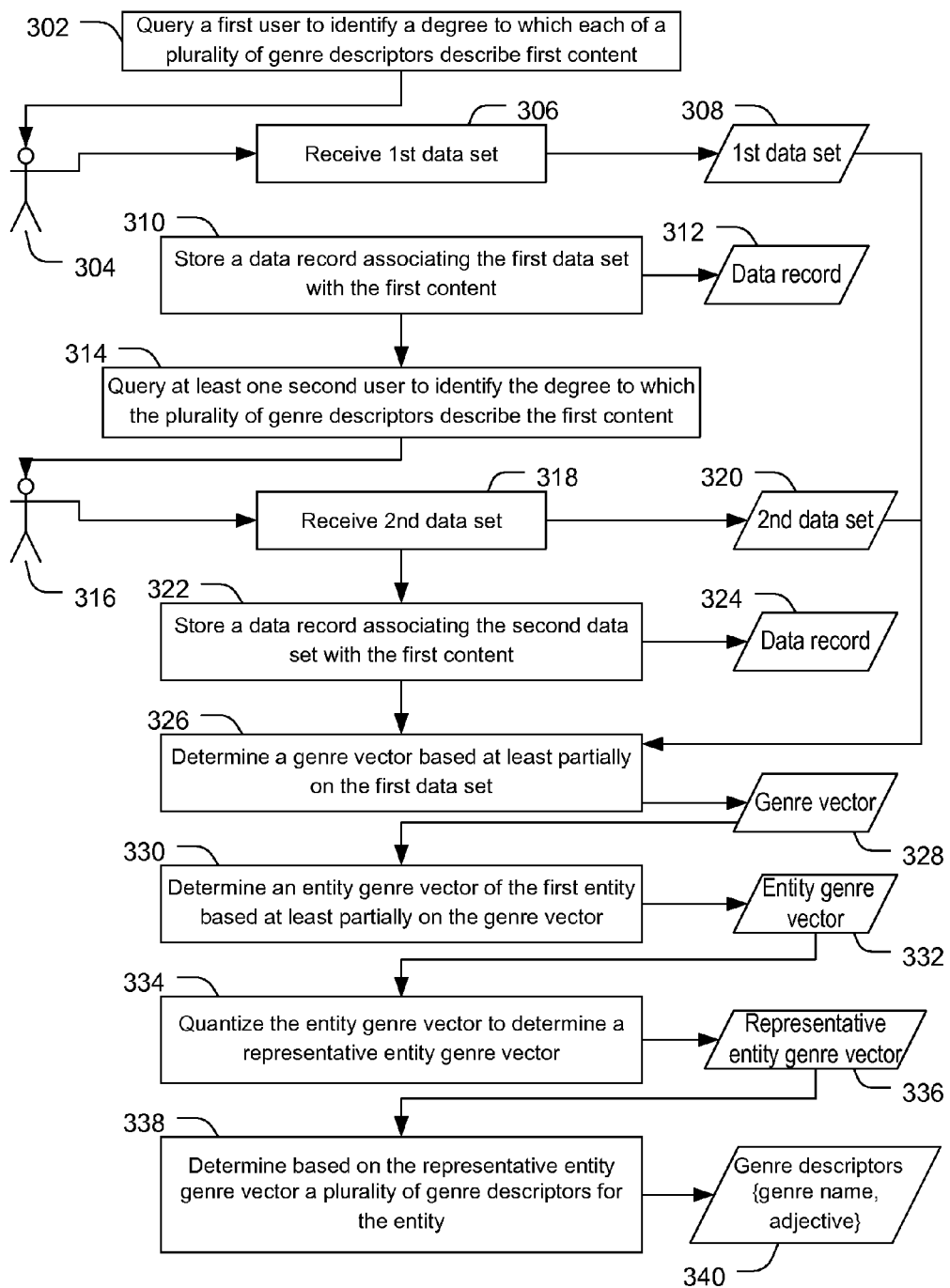
FIG. 3 is flow chart of a second embodiment of a method of determining genre information.

FIG. 3 depicts a second particular embodiment of a method of determining genre information. The method includes, at 302, querying a first user 304 to identify a degree to which each of a plurality of genre descriptors describe a particular content item, such as a content item that may be available from a catalog for purchase, rent or download. For example, a user interface display, such as the user interface display illustrated in FIG. 10 may be presented to the first user 304. The user interface display may present the first user 304 with the opportunity to provide input associating the particular content item with one or more genre descriptors. The method also includes, at 306, receiving a first data set 308. The first data set 308 includes information associating the plurality of genre descriptors and strength values with the particular content. Each strength value indicates the degree to which the associated genre descriptor describes the particular content. The method also includes, at 310, storing a data record 312 associating the first data set 308 with the particular content. The method may also include, at 314, querying at least one second user 316 to identify the degree to which the plurality of genre descriptors describe the particular content. The method further includes, at 318, receiving a second data set 320 from the at least one second user 316. The second data set 320 includes a plurality of genre descriptors and associated strength values related to the particular content. Each strength value indicates the degree to which the associated genre descriptor describes the particular content. The method also includes, at 322, storing a data record 324 associating the second data set 320 with the particular content.

In a particular embodiment, the method includes, at 326, determining a genre vector 328 based at least partially on the first data set 308. The genre vector 328 is descriptive of a coordinate location of the particular content in genre space. The genre space includes an axis associated with each of the plurality of genre descriptors. A coordinate location along each axis is determined based on the strength value associated with the genre descriptor. For example, a Rock genre descriptor may be associated with a Rock genre axis in the genre space. The strength value associated with the Rock genre descriptor for the particular content may indicate how far along the Rock genre axis the coordinate location of the particular content is in the genre space. Examples of the genre space are further described with reference to FIG. 8 and FIG. 9.

In a particular embodiment, the particular content is associated with an entity. For example the particular content may include a particular musical recording and the entity may include an artist, production company or distribution company associated with the particular recording. In another example, the particular content may include a book and the entity may include an author, publisher, editor or distributor of the book. The method also includes, at 330, determining an entity genre vector 332 based on the genre vector 328. In a particular embodiment, the entity genre vector 332 is an aggregation of all of the genre vectors that are associated with the entity. For example, where the entity is a band, the entity genre vector may be an aggregation of all of the genre vectors of each song associated with the band. In another example, the entity genre vector can be determined based on genre vectors associated with members of the band. Thus, while the genre vector 328 describes the location of a particular content item in the genre space, the entity genre vector 332 describes an aggregate location of all of the works associated with the entity in the genre space. For example, the entity genre vector 328 may represent an average location of the entity in genre space based on the locations of the content items associated with the entity.

In a particular embodiment, the method also includes, at 334, quantizing the entity genre vector 332 to determine a representative entity genre vector 336. The method also includes, at 338, determining, based on the representative entity genre vector 336, a plurality of genre descriptors 340 for the entity. Each of the plurality of genre descriptors 340 may include a genre name and an adjective indicating a degree to which the genre name describes the content associated with the entity. For example, the genre name may be "Rock" and the adjective may be "mostly." Thus, a particular genre descriptor may indicate that content associated with the entity is "mostly Rock."

In a particular embodiment, the genre vectors 328 are quantized to determine quantized genre vectors, and the quantized genre vectors may be aggregated to determine the representative entity genre vector 336. In this embodiment, quantizing the genre vectors enables simplified calculations and data handling to aggregate the quantized vectors relative to the calculation and data handling required to aggregate the genre vectors 328 without quantizing them first.

Figure 4:
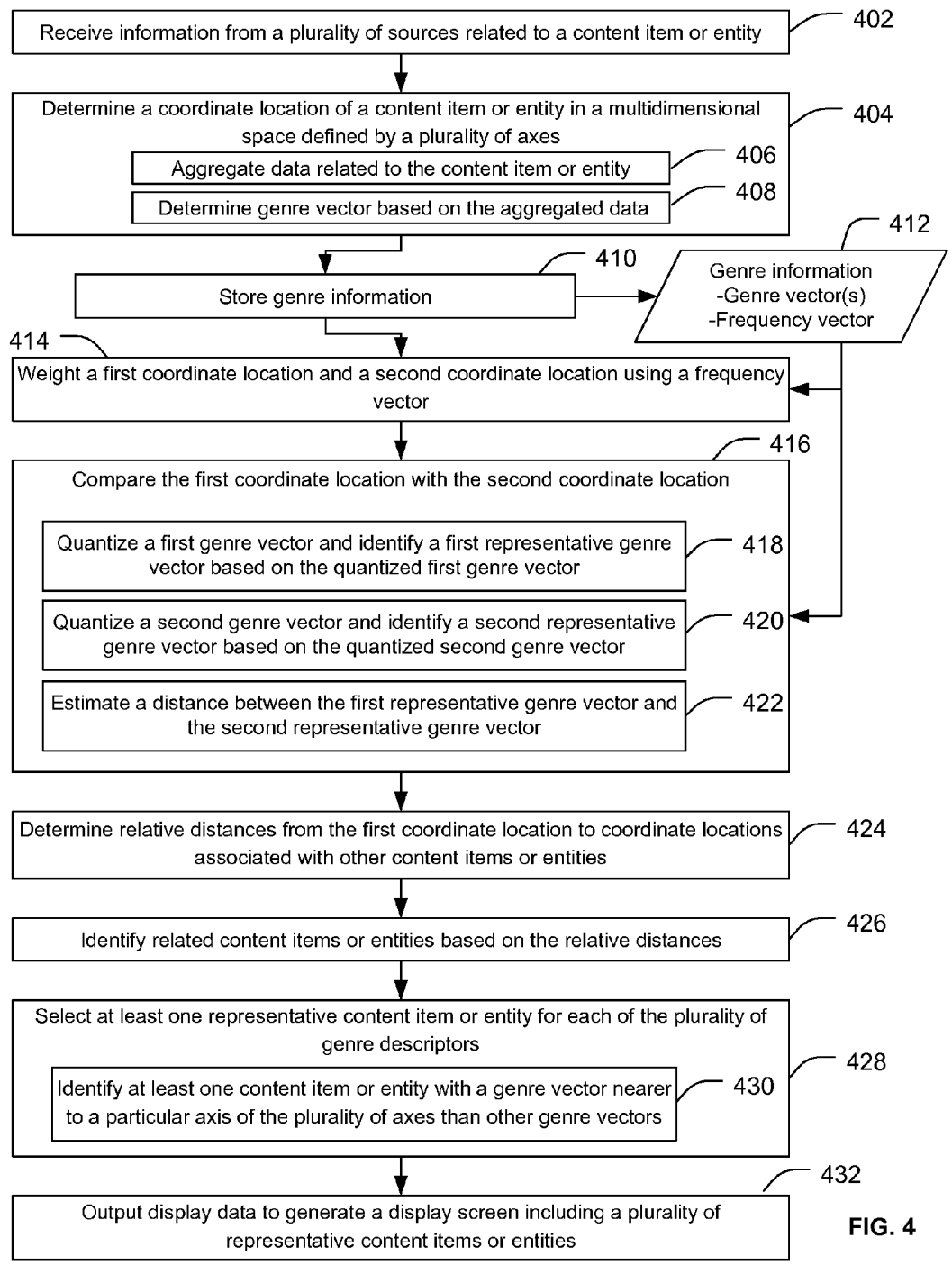
FIG. 4 is flow chart of a third embodiment of a method of determining genre information.

FIG. 4 depicts a third particular embodiment of a method of determining genre information. The method includes, at 402, receiving information related to a particular content item or entity from a plurality of sources. For example, the information may include strength values indicating a degree to which each of a plurality of content descriptors relates to the content item or entity. The method also includes, at 404, determining a coordinate location of the content item or entity in a multi-dimensional space defined by a plurality of axes. Each axis may be associated with a particular content descriptor, such as a genre. Thus, the coordinate location of a particular content item in the multidimensional genre space may indicate a degree to which each genre describes the content item. In a particular embodiment, determining a coordinate location of the content item or entity may include, at 406, aggregating data related to the content item or entity and, at 408, determining a genre vector based on the aggregated data. For example, data received from a plurality of users may be aggregated to determine an average or representative genre vector associated with the content item or entity. The method also includes, at 410, storing genre information 412 for a plurality of content items and entities. The genre information 412 may include one or more genre vectors and one or more frequency vectors. Each genre vector may describe the coordinate location of a particular content item or entity in the multidimensional space. The frequency vector may indicate a frequency with which a particular genre is associated with content items or entities in the genre information 412. For example, a large number of content items or entities may be associated with the genre Pop; whereas relatively few content items or entities may be associated with the genre Death Metal.

The method also includes, at 414, weighting a first coordinate location of a first content item or entity and a second coordinate location of a second content item or entity using the frequency vector. Weighting the coordinate locations using the frequency vector may be useful to differentiate content items or entities based on less commonly used or less frequently occurring genres. For example, as discussed above, the genre Pop may be associated with a large number of content items and entities; whereas, the genre Death Metal may be associated with relatively few content items and entities. Coordinate locations can be weighted based on the frequency vector to provide more discrimination between two or more entities. To illustrate, a more frequently occurring genre may be assigned a lower weighting value and a less frequently occurring genre may be assigned a higher weighting value. Weighting the genre vectors in this manner emphasizes the distinctive features of the content item or entity over the more common features.

The method also includes, at 416, comparing a first coordinate location of a first content item or entity with a second coordinate location of a second content item or entity. In a particular embodiment, comparing the coordinate locations may include, at 418, quantizing a first genre vector and identifying a first representative genre vector based on the quantized first vector. Comparing the coordinate locations may also include, at 420, quantizing a second genre vector and identifying a second representative genre vector based on the quantized second genre vector. Comparing the coordinate locations may also include, at 422, estimating a difference between the first representative genre vector and the second representative genre vector. To illustrate, quantizing the genre vectors may reduce the number of possible values that each vector can contain. By reducing the number of possible values that each vector can contain, the process of determining the difference between the vectors can be simplified. In a particular embodiment, the process can be simplified by truncating the genre vectors before the first coordinate location and the second coordinate location are compared. For example, only a most frequently assigned set of genres for each content item or entity may be used to determine the coordinate locations. To illustrate, only the most common 8 genres assigned to each content item or entity may be used. Any number of the most commonly assigned genres may be used to truncate the genre vectors. For example, in a particular embodiment, the genre vectors may initially contain values ranging from 0 to 100. The quantized genre vectors may include values from 0 to 10.

Hence, a reduction in the number of possible values that each genre vector can take is achieved. Accordingly, the calculations and data handling required to determine the distance between the genre vectors are simplified. Quantizing genre vectors and estimating distance between genre vectors is discussed further with reference to FIG. 9.

The method also includes, at 424, determining relative distances from the first coordinate location to coordinate locations associated with a plurality of other content items or entities. Relative distances between the first coordinate location and coordinate locations of the other content items or entities may be used to determine how similar or how different particular content items or entities are to one another. That is, content items that are closer together in the genre space may be more similar to one another than content items that are further apart in the genre space.

The method also includes, at 426, identifying content items or entities related to the first content item or entity based on the relative distances. For example, where a user indicates a desire to identify another entity similar to a particular entity, the relative distances in genre space may be used to identify similar entities to recommend.

The method also includes, at 428, selecting at least one representative content item or entity for each of the plurality of genre descriptors. In a particular embodiment, the representative content item or entity is selected, at 430, by identifying at least one content item or entity with a genre vector nearer to a particular axis of the plurality of axes in the genre space than other genre vectors. An entity whose genre vector lies particularly close to a particular genre axis may be considered an exemplar of the particular genre. That is, the entity or content item may be considered to be a better example of the particular genre than other entities that are further from the genre axis. When a user requests more information about a particular genre, the method may select an exemplar of the genre based on the relative distance of various genre vectors to the genre axis of the particular genre. The method also includes, at 432, outputting display data to generate a display screen including a plurality of representative content items or entities. For example, the output may include a listing of content items or entities that are exemplars of a particular genre.

Figure 5:
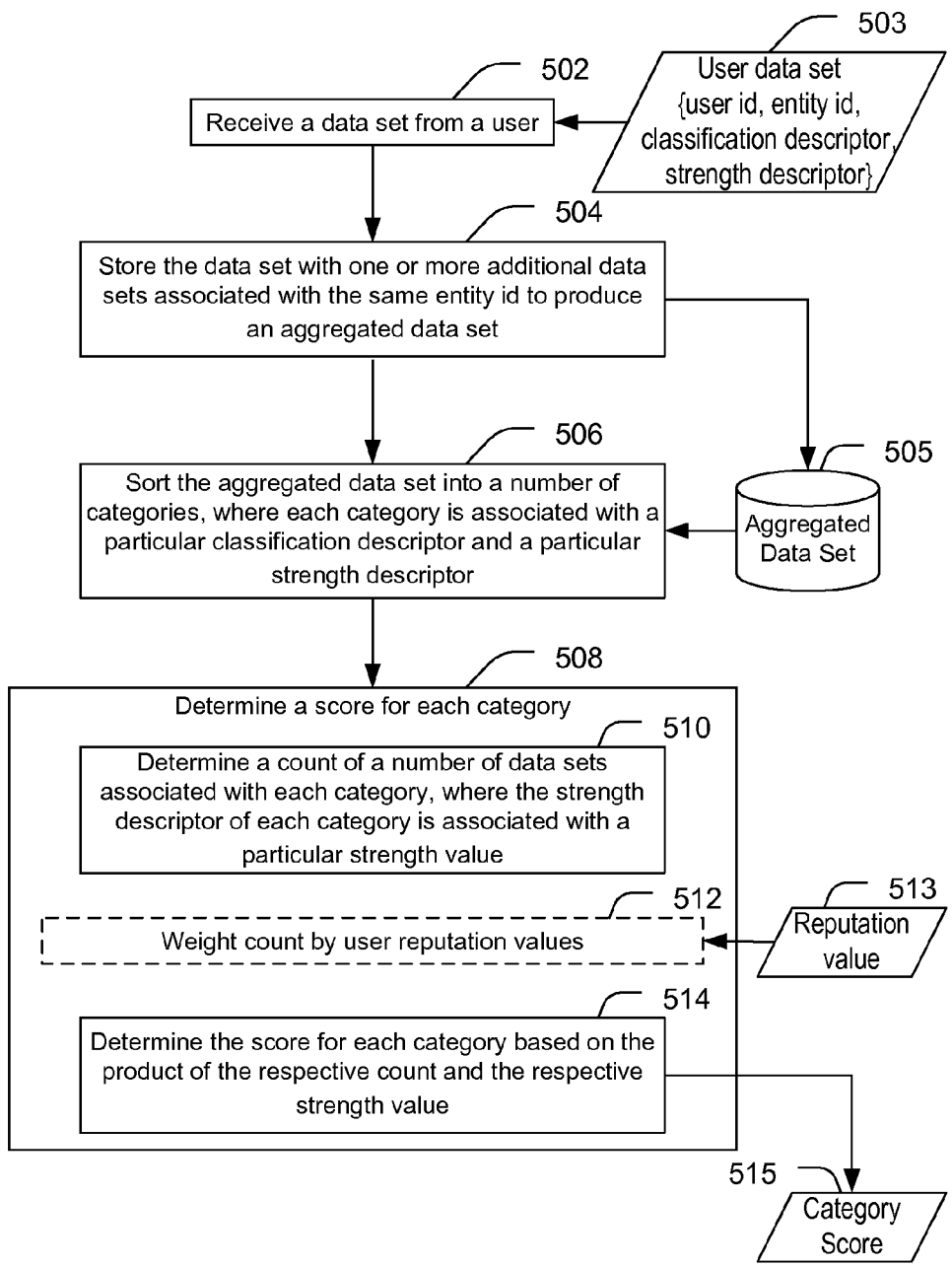
FIG. 5 is a flow chart of a particular embodiment of a method of classifying an entity.

FIG. 5 depicts a particular embodiment of a method of classifying an entity. In a particular embodiment, the entity can include an artistic or literary work (such as a book, movie, play, or music release), an individual or group associated with an artistic or literary work (such as an actor, director, producer, artist, or band), or a company associated with an artistic or literary work (such as a record company, a movie company, or a distribution company).

The method includes, at 502, receiving a data set 503 from a user. The data set includes a user identifier, an entity identifier, a classification descriptor, and a strength descriptor. The user identifier may include a number of letters, numbers, symbols, or any combination thereof, assigned to a particular user. The entity identifier may also be a number of letters, numbers, symbols, or any combination thereof, assigned to a particular entity.

The method also includes, at 504, storing the data set 503 with one or more additional data sets associated with the same entity identifier to produce an aggregated data set 505. For example, a data set 503 that includes an entity identifier associated with a particular band, such as U2, would be placed into an aggregated data set 505 that includes additional data sets related to U2. Additionally, the method includes, at 506, sorting the aggregated data set 505 into a number of categories. Each category is associated with a particular classification descriptor and a particular strength descriptor. In an illustrative embodiment, data sets associated with U2 may be sorted into a category that includes the classification descriptor "Rock" or "Pop" to describe a type of music that users associate with U2 and a strength descriptor, such as "Mostly" or "Hints of," to describe the strength of the correlation that users have between U2 and the particular classification descriptor. For example, a category for U2 may include "Mostly Pop" or "Hints of Rock."

At 508, the method includes determining a score for each category of the aggregated data set 505. A score for each category is determined beginning at 510 by determining a count of a number of data sets associated with each category. For example, the aggregated data set 505 may include 10,000 individual data sets associated with the category "Mostly Pop" for U2. In some embodiments, the method proceeds to 512, where the count is weighted based on one or more user reputation values 513. A user reputation value may relate to a peer rating or moderator rating given to a particular user. In an illustrative embodiment, a data set submitted by a user with a reputation value of "very reliable" may be weighted at 90%. The method also includes, at 514, determining the score 515 for each category based on the product of the respective count and a respective strength value. In some embodiments, the strength descriptor for each category may be associated with a particular strength value. In one example, the strength value of the strength descriptor "Mostly" may be 4 and the strength value of the strength descriptor "Hints of" may be 1. Thus a score for a category of "Mostly Pop" associated with 10,000 data sets would be 40,000 and a score for a category of "Hints of Rock" associated with 5,000 data sets would be 5,000.

Figure 6:
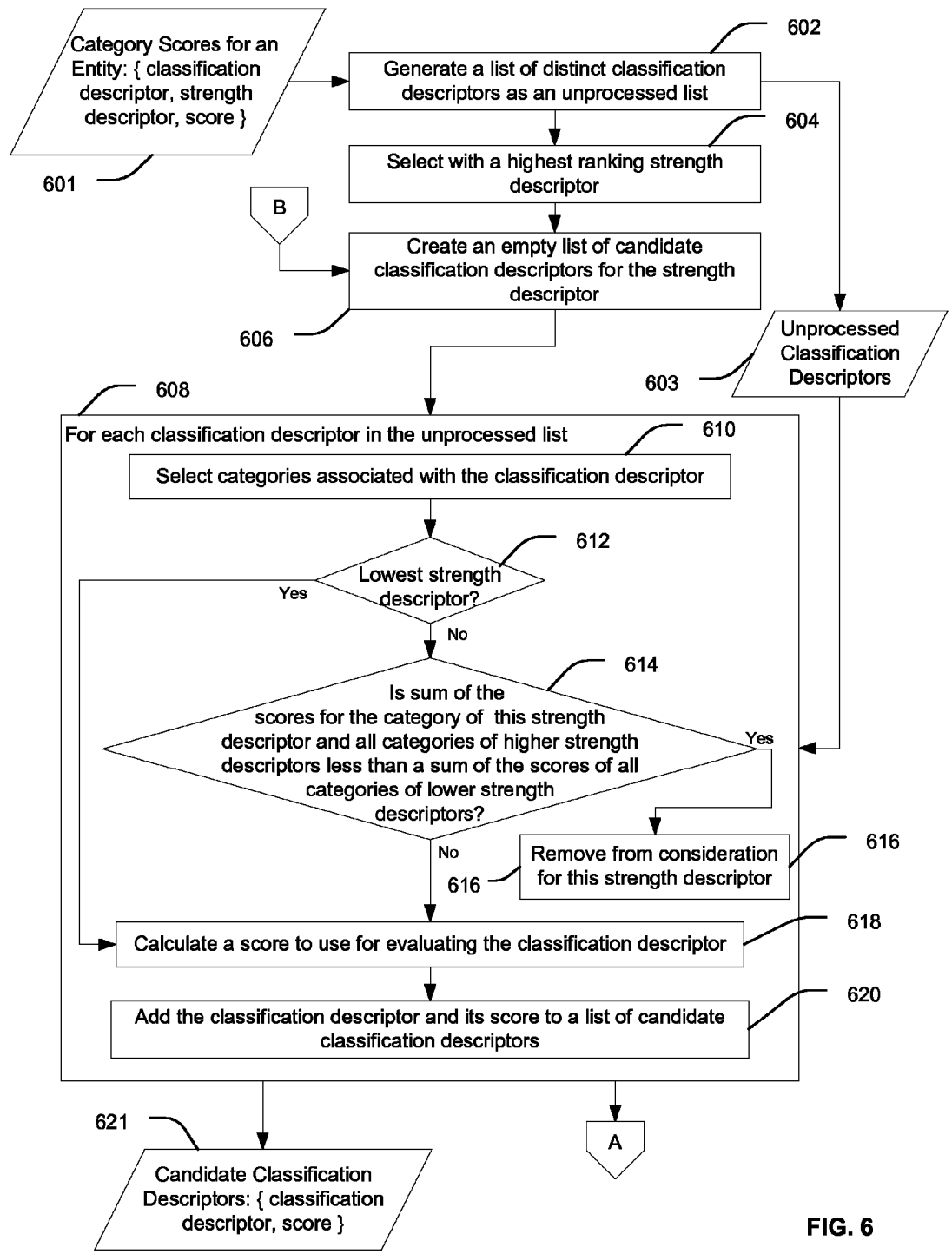
FIG. 6 is a flow chart of a portion of a second embodiment of a method of classifying an entity.

FIG. 6 is a flow chart of a portion of a second embodiment of a method of classifying an entity. In a particular embodiment, the method illustrated in FIG. 6 may be linked with the method illustrated in FIG. 5. For example, the category score 515 of FIG. 5 may be used in the method of FIG. 6. At 602, the method includes generating a list of the distinct classification descriptors associated with non-zero scores for a particular entity as an unprocessed list 603. For example, when a category "Mostly Pop" for the band U2 has a score of 1,000, "Pop" would be included in the unprocessed list 603. However, when a category "Hints of Classical" for the band U2 has a score of zero, "Classical" would not be included in the unprocessed list 603. The method also includes, at 604, selecting a highest ranking strength descriptor to begin determining candidate classification descriptors 621. In an illustrative embodiment, the highest ranking strength descriptor may be "Mostly." The method then advances to 606 where an empty list is created to hold candidate classification descriptors 621 for the strength descriptor currently being processed.

Moving to 608, a process including steps 610-620 is performed for each classification descriptor remaining in the unprocessed list 603. At step 610, the method includes selecting the categories associated with a particular classification descriptor. To illustrate, the categories "Mostly Pop," "Quite Pop," and "Hints of Pop," may all be selected for the classification descriptor "Pop."

The method then advances to decision 612. At decision 612, the method includes determining if the strength descriptor currently being processed is the lowest strength descriptor, such as the strength descriptor "Hints of." When the strength descriptor currently being processed is the lowest strength descriptor, then the method proceeds to 618 where the classification descriptor is added to the list of candidate classification descriptors 621 for the particular entity. For example, if the classification descriptor "Rock" has not been assigned to the band U2 and the strength descriptor evaluated at 612 is "Hints of," then the classification descriptor "Rock" may be added to the list of candidate classification descriptors 621 for U2.

Returning to decision 612, when the strength descriptor currently being processed is not the lowest strength descriptor, the method moves to decision 614. At decision 614, a first sum of the score for the category related to the current strength descriptor and the scores of all categories related to a higher strength descriptor is compared to a second sum of scores of all categories related to lower strength descriptors. For example, when processing the classification descriptor "Pop" and the strength descriptor is "Quite," the first sum, including scores for the "Quite Pop" category and the "Mostly Pop" category, is compared to the second sum, including the score for the "Hints of Pop" category. When the first sum is less than the second sum, the method proceeds to 616 where the classification descriptor is removed from consideration for this strength descriptor. Otherwise, the method proceeds to 618 where a score is calculated for use in evaluating whether or not this classification descriptor should be selected as a designated category classification for the current strength descriptor. In an illustrative embodiment, this score is evaluated as the sum of all the category scores related to the classification descriptor, regardless of their strength descriptor. The method then advances to 620 where the classification descriptor and its associated score are added to the list of candidate classification descriptors 621. When all classification descriptors remaining in the unprocessed list 603 have been processed by 608, the method proceeds to off-page reference A.

Figure 7:
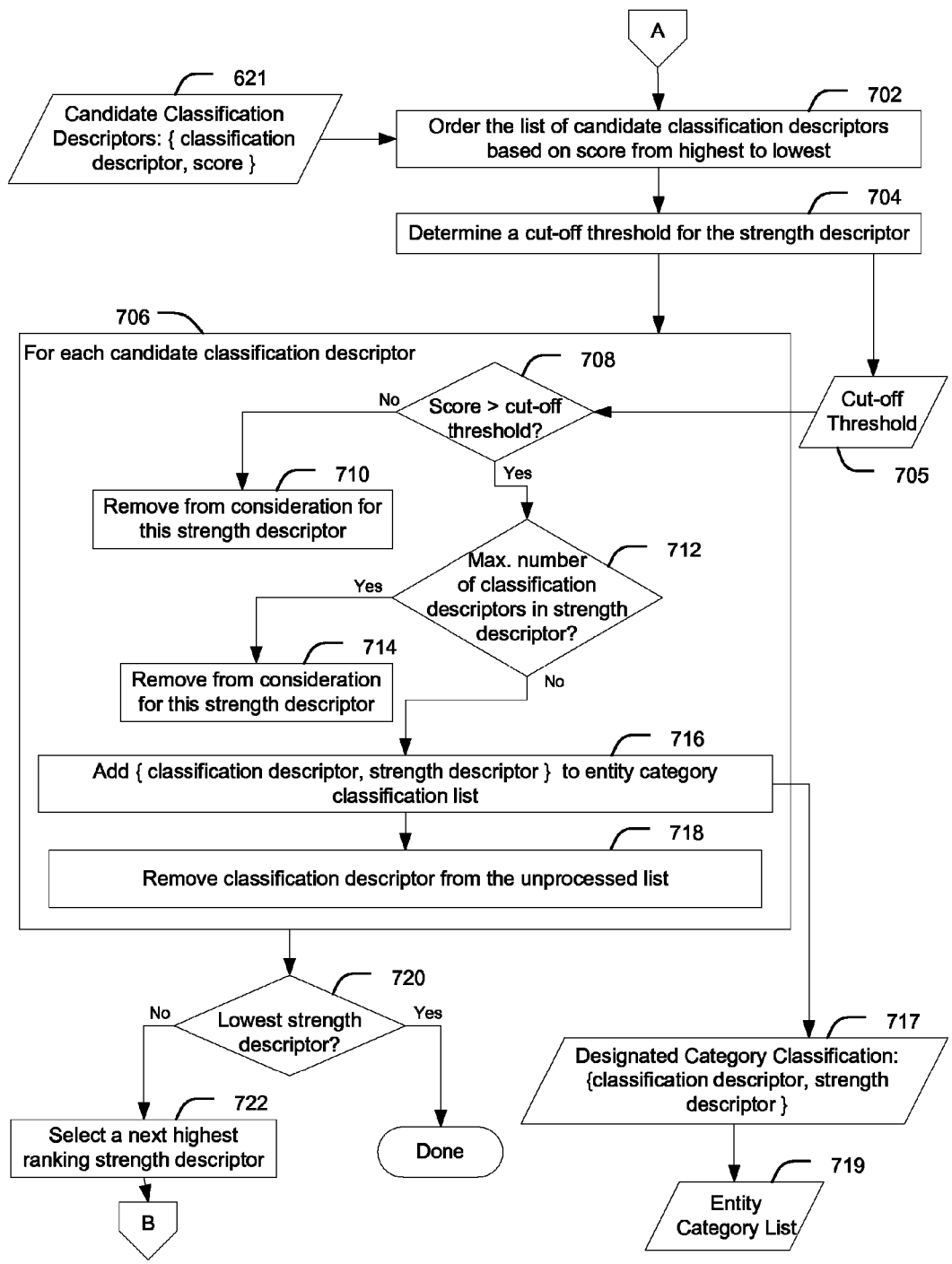
FIG. 7 is a flow chart of a portion of the second embodiment of the method of classifying an entity that started in FIG. 6.

FIG. 7 is a flow chart of a second portion of the second embodiment of the method of classifying an entity that is continued from FIG. 6. From the off-page reference A, the method proceeds to 702. At 702, the method includes ordering the list of candidate classification descriptors 621 based on score from highest to lowest. For example, for the strength descriptor "Mostly" the band U2 may be associated with the candidate classification descriptors "Pop" with a score of 10,000 and "Rock" with a score of 1,000. The score may be determined as shown at 620 in FIG. 6. Proceeding to 704, the method includes determining a cut-off threshold 705 for the strength descriptor currently being processed. In one embodiment, the cut-off threshold 705 is determined by dividing a sum of scores for all candidate classification descriptors 621 associated with the particular strength descriptor by a total number of candidate classification descriptors for that particular strength descriptor. For example, the artist Beyonce may be associated with the candidate classification descriptors "Pop" having a score of 10,000 and "R&B" having a score 1,000. The cut-off threshold 705 would be the total number of votes 11,000 divided by 2, such that the cut-off threshold would be 5,500.

Moving to 706 a process including the steps 708-718 is performed for each candidate classification descriptor 621. At decision 708, the method includes determining whether the score of a particular candidate classification descriptor 621 being processed is above the cut-off threshold 705. Continuing with the example above related to the artist Beyonce, the classification descriptor "Pop" having a score of 10,000 is above the cut-off threshold of 5,500, but the classification descriptor "R&B" having a score of 1,000 is not above the cut-off threshold 5,500. When the score for a particular candidate classification descriptor 621 is not above the cut-off threshold 705, the method proceeds to 710 and the particular candidate classification descriptor 621 is removed from consideration. When the score for the particular classification descriptor 621 is above the cut-off threshold 705, the method proceeds to decision 712.

At decision 712, an evaluation is made as to whether a maximum number of classification descriptors has been reached for a particular strength descriptor. When the maximum number of classification descriptors for the particular strength descriptor has been reached, the method proceeds to 714 where the particular candidate classification descriptor 621 is removed from consideration. For example, the maximum number of categories for a particular strength descriptor may be 5, such that if a candidate classification descriptor is the sixth classification descriptor to be evaluated for that strength descriptor, then the sixth classification descriptor is removed from consideration. When the maximum number of classification descriptors for the strength descriptor has not been reached, the method proceeds to 716 where the candidate classification descriptor and its associated strength descriptor are considered a designated category classification 717 and are added to an entity category list 719. To illustrate, the candidate classification descriptor of "Pop" may be added with the strength descriptor "Mostly" to the category list associated with the artist Beyonce. The score associated with the candidate classification descriptor 621 may also be associated with the designated category classification 717 to allow additional processing at a later stage. The entity category list 719 may be used to generate display data to form a display including information about the categories associated with an entity. For example, an informational display associated with the artist Beyonce may include the category descriptor "Mostly Pop." The method then advances to 718 where the classification descriptor is removed from the unprocessed list 603 (shown in FIG. 6), so that it cannot be considered as a candidate classification descriptor for lower strength descriptors.

At decision 720, an evaluation is made as to whether the strength descriptor currently being processed is the lowest strength descriptor. If it is the lowest strength descriptor then the entity category list 719 is considered complete. If it is not then, the method proceeds to 722 where the next highest ranking strength descriptor is selected for processing and the method advances to off-page reference B, which leads to 606, as shown in FIG. 6.

FIG. 8 depicts a particular embodiment of a genre space, generally designated 800. The genre space 800 includes a plurality of axes 802, 804, and 806. While three axes are illustrated, the genre space 800 can include any number of axes including more than three or fewer than three. The illustrated genre axes 802-806 include a Pop genre axis 802, a Rock genre axis 804, and a Death Metal genre axis 806. The Rock genre axis 804 and the Pop genre axis 802 are illustrated in FIG. 8 as lying on the plane of the paper. The Death Metal genre axis 812 is illustrated as projecting out of the page.

In a particular embodiment, it may be assumed that each genre axis is orthogonal to each other genre axis in the genre space 800. For example, the Rock genre axis 804 may be considered to be independent of and orthogonal to the Death Metal genre axis 806, as well as, for example a Classic Rock genre axis (not shown). In another particular embodiment, related axes may not be considered orthogonal to one another. For example, the genre space 800 may include a Space Rock genre axis (not shown) that includes a component along the Rock genre axis 804. That is, the Space Rock genre axis is not orthogonal to the Rock genre axis 804.

The genre space 800 also includes genre vectors 811 and 817 associated with particular entities. In the illustrated embodiment, the entities are musical artists or groups. The genre space 800 also includes coordinate locations 810 and 816 associated with each entity. For example, the coordinate location 810 is associated with the band The Beatles, and the coordinate location 816 is associated with the band U2.

Referring to FIG. 9 a simplified embodiment of the genre space 800 is illustrated, and is generally designated 900. The simplified genre space 900 includes only two axes, the Pop genre axis 802 and the Rock genre axis 804. For simplicity of discussion, The Beatles coordinate location 810 and the U-2 coordinate location 816 have been represented as coordinates on a plane formed by the Pop genre axis 802 and the Rock genre axis 804. In the simplified genre space 900, The Beatles coordinate location 810 is the nearest to the Pop genre axis 802. Hence, The Beatles may be selected as an exemplar of the Pop genre. Additionally, in describing The Beatles, the simplified genre space 900 may be used to select genre descriptors and strength descriptors associated with The Beatles. Each axis 802, 804 includes strength values. For example, the Pop genre axis 802 includes strength values ranging from 0 to 3. The Beatles have a strength value of approximately 2.8 along the Pop genre axis 802. Additionally, The Beatles have a strength value of approximately 1.1 along the Rock genre axis 804. Thus, The Beatles coordinate location is (1.1, 2.8). Each strength value quantum (or quantized strength value) is associated with a strength descriptor. For example, the quantized strength value 3 is associated with the strength descriptor "mostly," the quantized strength value 2 is associated with the strength descriptor "quite," and the quantized strength value 1 is associated with the strength descriptor "hints of."

In a particular embodiment, to determine strength descriptors associated with a particular entity, the coordinate location associated with a particular entity may be quantized. That is, a coordinate location associated with the entity may be adjusted to the nearest intersection of quantized strength values, as illustrated in FIG. 9. With respect to The Beatles, for example, the coordinate location (1.1, 2.8) is nearest to the intersection of the quantized strength value 3 along the Pop genre axis 802 and the value 1 along the Rock genre axis 804. Hence, a quantized coordinate location 904 or quantized genre vector associated with The Beatles may have a coordinate location of (1,3). Similarly, the coordinate location associated with U2 816, may be quantized to a coordinate location 902 of 2 along the Pop genre axis 802 and 2 along the Rock genre axis 804. Based on the quantized coordinate locations, The Beatles may be said to be "mostly Pop with hints of rock," and U-2 may be said to be "quite Pop and quite Rock."

Additionally the quantized coordinate locations 902, 904 may be used to simplify determining how similar two entities are. For example, determining a distance between coordinate locations 810 and 816 may be relatively computationally intensive. However, by quantizing the coordinate locations associated with each entity to the quantized coordinate locations 904 and 902, a lookup table can be used to estimate the distance. Such quantization may be particularly useful in multidimensional space where tens, hundreds or even more genres may be represented and associated with each content item or entity. Further, even when exact distances between coordinate locations are calculated, the quantized coordinate locations 902, 904 can be used to reduce the portion of the genre space 900 that is searched for each coordinate location 810, 816; thereby simplifying calculation of exact distances between the coordinate locations 810, 816.

Figure 10:
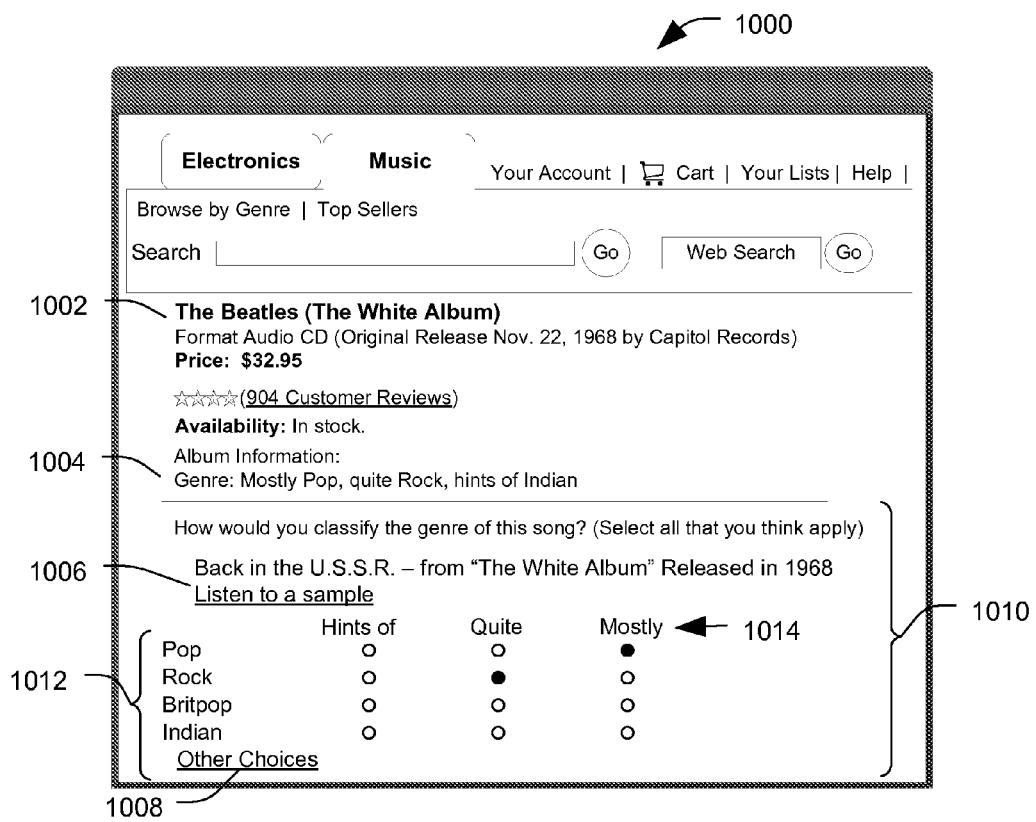
FIG. 10 is an illustration of a first particular embodiment of a user interface display.

FIG. 10 depicts a first particular embodiment of a user interface display to determine genre information, the user interface display generally designated 1000. The user interface display 1000 includes information about a particular entity or content item. As illustrated, the user interface display 1000 includes information about The Beatles White Album 1002. However, the user interface display 1000 may also be associated with another entity, such as The Beatles generally or the record company Capitol Records. The user interface display 1000 also includes a description 1004 of the genre associated with the particular entity 1002. For example, the genre is described as "mostly Pop, quite Rock with hints of Indian." The user interface display 1000 also includes a voting input 1010. The voting input 1010 enables a particular user to provide information about how the user perceives the genre of a particular content item or entity. For example, as illustrated, the voting input 1010 requests information about the genre associated with The Beatles song "Back in the USSR" from the White Album. The voting input 1010 may provide the user an opportunity to hear a sample of the particular content item 1006. Additionally, the voting input may include a plurality of genre selections 1012 and associated strength descriptors 1014. Other genre descriptors may be available by selecting a user input 1008. In a particular embodiment, the user may also be enabled to input a new genre descriptor. For example, the user interface display 1000 may be an initial display that presents a set of the most commonly assigned genres or a set of genres that have been assigned by a specific number of user or to a specific number of entities or content items. If the user desired to select a genre that is not shown, the user can select the other choices option 1008 which may cause a subsequent user interface display to be presented. The subsequent user interface display may include another set of genres, may include a search input to search for a genre descriptor, may include a user input to specify a new genre, or any combination thereof. In operation, the user may select a particular strength descriptor 1014 associated with a genre to describe how that genre relates to the content item or entity. As illustrated in FIG. 10, the genre descriptors and strength descriptors "mostly Pop" and "quite Rock" have been selected.

FIG. 11 depicts a second particular embodiment of a user interface display to determine genre information, the user interface display generally designated 1100. The user interface display 1100 includes an option for a user to browse by genre 1102. The browse by genre display includes a plurality of genre descriptors 1104 and associated with each genre descriptor at least one exemplar 1106 of the genre. In a particular illustrative embodiment, the exemplars 1106 are ordered in the display based popularity. The browse by genre display may also include an option 1108 for a user to listen to a sample of one or more of the exemplars of the particular genre.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Particular embodiments can be implemented using a computer system executing a set of instructions that cause the computer system to perform any one or more of the methods or computer based functions disclosed herein. The computer system may operate as a standalone device or may be connected, e.g., using a network, to other computer systems or peripheral devices. For example, the general computer system can include or be included within any one or more of the user computer devices, genre mapping systems, or databases depicted in FIG. 1. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable medium. The term "computer-readable medium" includes a single medium or multiple media, such as a centralized or distributed database, and/or associated caches and servers that store one or more sets of instructions. The term "computer-readable medium" also includes any medium that is capable of storing, encoding or carrying a set of instructions for execution by a processor or that cause a computer system to perform any one or more of the methods or operations disclosed herein.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   acquiring data sets that include a plurality of strength values and a plurality of classification descriptors for an entity that produced a particular content, wherein each strength value indicates a degree to which an associated classification descriptor describes the entity;
   sorting the classification descriptors into a plurality of categories, each category storing a unique combination of a classification descriptor and an associated strength value;
   determining a score for each category of the plurality of categories, each score being calculated based at least on a number of times that a corresponding category appears in the data sets; and
   for each set of categories that have a unique strength value:
      obtaining a cut-off threshold by dividing a sum of scores of corresponding categories by a number of the corresponding categories; and
      selecting each of one or more classification descriptors having an associated score that is above the cut-off threshold as a designated classification descriptor for the entity.

2. The method of claim 1, wherein the determining includes determining a score for a category by multiplying an strength value of the category by the number of times that the category appears in the data sets.

3. The method of claim 1, further comprising:
   querying at least one user to identify a degree to which a plurality of genre descriptors describe the particular content;
   receiving additional data sets including the plurality of genre descriptors and associated additional strength values related to the particular content, wherein each additional strength value indicates the degree to which an associated genre descriptor describes the particular content; and
   storing a data record associating the data set with the particular content.

4. The method of claim 3, further comprising determining a genre vector based at least partially on the plurality of genre descriptors, wherein the genre vector is descriptive of a coordinate location of the particular content in a genre space that includes an axis associated with each of the plurality of genre descriptors, wherein a coordinate along each axis is determined based on a particular strength value of the additional data sets.

5. The method of claim 4, further comprising determining an entity genre vector of the entity based at least partially on the genre vector.

6. The method of claim 5, wherein the entity genre vector is further determined by averaging the genre vector with one or more additional genre vectors of other content associated with the entity.

7. The method of claim 1, wherein the entity comprises a collection of content including the particular content and the other content.

8. The method of claim 1, wherein the entity comprises at least one of an artist, a group of artists, an author, a production company or a distribution company.

9. The method of claim 1, wherein the particular content comprises at least one of a performance, a literary work, and an artistic work.

10. The method of claim 5, further comprising quantizing the entity genre vector to determine a representative entity genre vector, wherein the acquiring includes determining based on the representative entity genre vector the plurality of genre descriptors for the entity.

11. A system, comprising:
one or more processors;
a memory that includes a plurality of components that comprises:
 a genre database to store genre information for a plurality of content items, wherein the genre information includes a genre vector for each content item, wherein the genre vector indicates a degree to which each of a plurality of genre descriptors that are received from one or more users describe each content item; and
 a genre mapping module to:
  analyze a plurality of genre vectors to determine a plurality of classification data sets for a content item, wherein each classification data set includes a strength descriptor and a genre descriptor, wherein the strength descriptor describes how relevant the genre descriptor is to the content item;
  ascertain strength values of the strength descriptors associated with each genre descriptor of the plurality of classification data sets to determine a most frequently occurring strength value;
  designate the most frequently occurring strength value as a representative strength value for the each genre descriptor;
  modify each strength descriptor for the each genre descriptor that has a higher strength value than the representative strength value to assume the representative strength value; and
  output one or more of the plurality of classification data sets that include at least one strength descriptor with a modified strength value.

12. The system of claim 11, wherein the genre mapping module is to further determine a coordinate location of a particular content item in a multi-dimensional space based on a corresponding genre vector, and modify the coordinate location based on weights assigned to the plurality of genre descriptors, wherein the multidimensional space is defined by a plurality of axes and each axis of the plurality of axes is associated with a particular genre descriptor.

13. The system of claim 12, wherein the plurality of components further comprises a location comparator to compare a first coordinate location of a first content item of the plurality of content items with a second coordinate location of a second content item of the plurality of content items.

14. The system of claim 13, wherein the location comparator is to compare the coordinate location of the first content item and the coordinate location of the second content item at least by:
 quantizing a first genre vector and identifying a first representative genre vector based on the quantized first genre vector, wherein the first genre vector is associated with the first coordinate location;
 quantizing a second genre vector and identifying a second representative genre vector based on the quantized second genre vector, wherein the second genre vector is associated with the second coordinate location; and
 estimating a distance between the first representative genre vector and the second representative genre vector.

15. The system of claim 14, wherein the location comparator is to further determine relative distances from the first coordinate location to coordinate locations associated with the plurality of content items, and to identify content items related to the first content item based on the relative distances.

16. The system of claim 15, wherein the relative distances are used to simplify calculation of distances between the first coordinate location and the coordinate locations associated with the plurality of content items.

17. The system of claim 12, further comprising an exemplar selection module to select one content item of a plurality of content items having the same degree of association to a particular genre descriptor as a representative content item for the particular genre descriptor when the one content item is more popular than the other content item of the plurality of content items.

18. The system of claim 17, further comprising a display interface to output display data to generate a display screen including a plurality of representative content items, wherein the plurality of representative content items are ordered in the display screen based at least partially on relative popularity of the plurality of content items.

19. The system of claim 17, wherein the exemplar selection module identifies at least one exemplar content item for a particular genre descriptor by identifying at least one content item with a genre vector nearer to a particular axis of the plurality of axes than other genre vectors, wherein the particular axis is associated with the particular genre descriptor.

20. The system of claim 12, wherein the plurality of components further comprises an aggregator module to aggregate data received from a plurality of sources related to a particular content item and to determine the genre vector for the particular content item based on the aggregated data.

21. The system of claim 12, wherein the plurality of components further comprises an aggregator module to aggregate data related to each of the plurality of content items, wherein the each of the plurality of content items is associated with a particular entity, and to determine an entity genre vector for the particular entity based on the aggregated data.

22. The system of claim 21, wherein the genre mapping module is further to determine a coordinate location of a particular entity in a multidimensional space defined by a plurality of axes based on an entity genre vector associated with the particular entity, wherein each axis of the plurality of axes is associated with a particular genre descriptor.

23. The system of claim 22, further comprising a location comparator module to compare a first coordinate location of a first entity with a second coordinate location of a second entity.

24. The system of claim 23, wherein the location comparator module is to further weight the first coordinate location of the first entity and the second coordinate location of the second entity using a frequency vector before comparing the first coordinate location of the first entity and the second coordinate location of the second entity, wherein the frequency vector includes information about a frequency with which each genre descriptor of the plurality of genre descriptors is associated with entities in the genre database.

25. The system of claim 21, wherein the plurality of components further comprises an exemplar selection module to select at least one representative entity for each of the plurality of genre descriptors, wherein the at least one representative entity for a particular genre descriptor has a large degree of association to the particular genre descriptor.

26. A method comprising:
  accessing a plurality of classification vectors, each classification vector including strength data indicating a degree of relevance of a particular classification descriptor to an entity;
  analyzing the plurality of classification vectors to determine a plurality of classification data sets for the entity, wherein each classification data set includes a strength descriptor and a classification descriptor, wherein the strength descriptor describes how relevant the classification descriptor is to the entity;
  ascertaining strength values of the strength descriptors associated with each classification descriptor of the plurality of classification data sets to determine a most frequently occurring strength value;
  designating the most frequently occurring strength value as a representative strength value for the each classification descriptor;
  modifying each strength descriptor for the each classification descriptor that has a higher strength value than the representative strength value to assume the representative strength value; and
  outputting one or more of the plurality of classification data sets that include at least one strength descriptor with a modified strength value.

27. The method of claim 26, wherein the classification descriptor comprises a description of a particular genre.

28. The method of claim 26, wherein each strength value indicate a degree of relevance of a corresponding classification descriptor to the entity.

29. The method of claim 26, wherein the modifying increases a number of classification descriptors with the representative strength value.

30. The method of claim 26, wherein the plurality of classification vectors are provided by users, wherein each of the users is associated with a user reputation score, and wherein the representative strength descriptor is modified based at least partially on the user reputation scores associated with the users.

31. The method of claim 26, wherein each strength descriptor comprises an adjective indicating a relative relevance of the classification descriptor to the entity.

32. The method of claim 31, wherein the strength descriptor comprises at least one of hints of, mainly, and quite.

33. A method, comprising:
  receiving a data set from a user, wherein the data set is associated with a particular entity and the data set includes a classification descriptor of a plurality of classification descriptors and an associated strength descriptor of a plurality of strength descriptors;
  storing the data set with a number of additional data sets associated with the particular entity to produce an aggregated data set, each additional data set including a classification descriptor of the plurality of classification descriptors and an associated strength descriptor of the plurality of strength descriptors;
  sorting the aggregated data set into a number of categories, wherein each category is associated with a particular classification descriptor and a particular strength descriptor;
  determining a score for each category of the number of categories, wherein the score is based on a number of data sets associated with a respective category and a strength value assigned to the particular strength descriptor of the respective category;
  determining a number of candidate classification descriptors assigned to a specific strength descriptor by analyzing the classification descriptors in the aggregated data set;
  rejecting a candidate classification descriptor that is last to be stored in the aggregated data set from consideration when the number of candidate classification descriptors previously assigned to the specific strength descriptor exceeds a maximum number of classification descriptors for the specific strength descriptor; and
  designating each of the candidate classification descriptors as a designated category classification for the particular entity when the number of candidate classification descriptors assigned to the specific strength descriptor does not exceed the maximum number of classification descriptors for the specific strength descriptor.

34. The method of claim 33, wherein the score associated with a particular category is based on one or more user reputation values, and wherein each of the one or more user reputation values is associated with a respective data set associated with the particular category.

35. The method of claim 33, wherein the rejecting the candidate classification descriptor includes rejecting the classification descriptor that is included in the data set.

36. The method of claim 33, wherein the number of candidate classification descriptors is determined by comparing the scores associated with the categories related to each particular classification descriptor with the scores associated with the categories related to one or more additional classification descriptors.

37. The method of claim 33, further comprising filtering the number of candidate classification descriptors prior to determining the number of candidate classification descriptors assigned to the specific strength descriptor.

38. The method of claim 37, wherein the number of candidate categories is filtered based one or more cut-off thresholds, wherein each cut-off threshold related to a particular entity is associated with the strength descriptor of the particular entity.

39. The method of claim 33, further comprising providing a user interface display indicating the particular entity and one or more designated categories associated with the particular entity.

40. The method of claim 38, wherein a cut-off threshold is determined by dividing a sum of strength descriptors for the number of candidate classification descriptors assigned to the specific strength descriptor by the number of candidate classification descriptors.

* * * * *